United States Patent
Foottit et al.

(10) Patent No.: US 8,683,544 B2
(45) Date of Patent: Mar. 25, 2014

(54) SYSTEM AND METHOD FOR PROVIDING ACCESS TO A NETWORK USING FLEXIBLE SESSION RIGHTS

(75) Inventors: Tom A. Foottit, Stittsville (CA); Yong Li, Ottawa (CA); Elizabeth Janet Clark, Ottawa (CA); Dmitry Toptygin, Kanata (CA); Joseph Jean Gaetan Michel Collette, Ottawa (CA); Randy Alan Jones, Nepean (CA)

(73) Assignee: Bridgewater Systems Corp., Ottawa (CA)

( * ) Notice: Subject to any disclaimer, the term of this patent is extended or adjusted under 35 U.S.C. 154(b) by 1341 days.

(21) Appl. No.: 12/120,612

(22) Filed: May 14, 2008

(65) Prior Publication Data

US 2009/0288134 A1 Nov. 19, 2009

(51) Int. Cl.
*G06F 17/00* (2006.01)

(52) U.S. Cl.
USPC ............ 726/1; 726/7; 726/8; 726/25; 726/28; 713/168; 455/432; 370/356

(58) Field of Classification Search
USPC ............ 726/1–7, 227; 713/153–156; 455/432
See application file for complete search history.

(56) References Cited

U.S. PATENT DOCUMENTS

| | | | | |
|---|---|---|---|---|
| 6,018,570 | A * | 1/2000 | Matison | 379/207.15 |
| 7,257,833 | B1 * | 8/2007 | Parekh et al. | 726/1 |
| 7,778,260 | B2 * | 8/2010 | Sturniolo et al. | 370/401 |
| 7,873,734 | B1 * | 1/2011 | Eidelman et al. | 709/227 |
| 7,912,822 | B2 * | 3/2011 | Bethlehem et al. | 707/705 |
| 8,027,296 | B2 * | 9/2011 | Hu et al. | 370/329 |
| 8,276,197 | B1 * | 9/2012 | Mangal et al. | 726/8 |
| 8,289,900 | B2 * | 10/2012 | DuMas et al. | 370/328 |
| 8,301,544 | B2 * | 10/2012 | Chatter et al. | 705/37 |
| 8,402,525 | B1 * | 3/2013 | Shah et al. | 726/8 |
| 8,434,128 | B2 * | 4/2013 | Kennedy | 726/1 |
| 2001/0053694 | A1 * | 12/2001 | Igarashi et al. | 455/433 |
| 2005/0254440 | A1 * | 11/2005 | Sorrell | 370/264 |
| 2007/0038759 | A1 * | 2/2007 | Hanson et al. | 709/227 |
| 2007/0200003 | A1 * | 8/2007 | Deprun et al. | 235/492 |
| 2007/0223462 | A1 * | 9/2007 | Hite et al. | 370/356 |
| 2007/0240209 | A1 * | 10/2007 | Lewis et al. | 726/15 |
| 2007/0248078 | A1 * | 10/2007 | Gundavelli et al. | 370/352 |
| 2008/0046963 | A1 * | 2/2008 | Grayson et al. | 726/1 |
| 2008/0062961 | A1 * | 3/2008 | Nowlan | 370/352 |
| 2008/0126221 | A1 * | 5/2008 | Swanson | 705/26 |
| 2008/0189776 | A1 * | 8/2008 | Constable | 726/7 |
| 2009/0038010 | A1 * | 2/2009 | Ma et al. | 726/23 |
| 2010/0303087 | A1 * | 12/2010 | Miao et al. | 370/401 |
| 2012/0221955 | A1 * | 8/2012 | Raleigh et al. | 715/736 |

OTHER PUBLICATIONS

Anis Charfi, Hybrid Web Service, Aug. 2004, ACM, vol. 4, pp. 30-38.*

* cited by examiner

*Primary Examiner* — Cordelia Zecher
*Assistant Examiner* — Viral Lakhia
(74) *Attorney, Agent, or Firm* — Zilka-Kotab, PC (57) ABSTRACT

A flexible rule engine allows a network operator to dynamically create and modify business rules that govern a subscriber's access to a communications network. The flexible rule engine governs subscriber transitions between various session states by testing for subscriber conditions, network conditions, and then performing specified actions based on these conditions. A rule editor provides the network operator with the ability to compose, edit and delete one or more rules in real time, using an appropriate user interface.

25 Claims, 4 Drawing Sheets

SYSTEM AND METHOD FOR PROVIDING ACCESS TO A NETWORK USING FLEXIBLE SESSION RIGHTS

BACKGROUND OF THE INVENTION

1. Field of the Invention

The present invention relates to a method and apparatus for electronic communications resource management, and more specifically to flexible management of subscriber access sessions to communications network resources.

2. Background Art

An increasingly large number of individuals use portable computing devices, such as laptop computers, personal data assistants (PDAs), smart phones and the like, to support mobile communications. The number of computing devices, and the number of networks that these devices connect to, has increased dramatically in recent years. Similarly, an increasing number of wireless Internet access services have been appearing in airports, cafes and book stores.

Typically users gain access to these networks by purchasing a subscription plan from a service provider. One type of subscription plan is a flat rate subscription plan. In a flat rate subscription plan a subscriber pays a fee for a billing cycle and is entitled to a set amount of network usage (i.e. a usage quota) during the billing cycle. For example, a user may pay $30 for a month and be entitled to 500 minutes of network time. The usage quota can be specified as a time per billing cycle amount (e.g., 500 minutes per month) or as a data volume per billing cycle amount (e.g., 1000 kB per month). In some flat rate subscription plans the usage quota is unlimited.

Another type of usage plan is an actual usage subscription plan. In an actual usage subscription plan a subscriber pays a set rate based on the actual amount of network usage during a billing cycle. For example, a user may pay $1 per minute of network usage. Actual usage plans can have incentives/penalties based on a subscriber's usage during a billing cycle. For example, in an actual usage subscription plan a subscriber may pay $1 per minute for the first 500 minutes and $2 per minute for every minute beyond 500 minutes during the billing cycle. Subscription plans can combine aspects of flat rate plans and usage plans. For example, a subscriber may pay $30 per month for 500 minutes of network usage and $1 per minute for every minute used after 500 minutes.

Many networks practice the concept of allowing users access only for a fixed period of time. The user acquires rights to access the network and then can access the network for a fixed period of time (perhaps over the course of several sessions) before their allowed time on the network is consumed and they are removed from the network.

The fixed time access plan is the simplest plan, and in its most basic form, is straightforward to implement. However, even minor adjustments result in significant challenges to the system of the network operator. In particular, where access systems are used across a variety of different network operators, the ability to provide useful access systems under a variety of operating scenarios is severely challenged. For example, different network operators may request that their subscribers consume their session rights only during a 'peak period' time of the day. In another scenario, certain types of subscribers in a particular communications network may have free access.

These different requirements are typically implemented by modifying the systems controlling the session rights to conform to the requirements of each network operator. The problem with this approach is that it requires custom modifications for each and every network operator. Moreover, such an approach does not allow each network operator any flexibility to change how session rights are used within that operator's network.

What is needed is a system and method by which individual network operators can achieve the flexibility to dynamically adapt their access requirements to meet evolving business considerations. By addressing this long standing challenge, network operators will be in a position to reduce cost, shorten time to market for new subscriber access features, and to more efficiently enable their bandwidth resources to be available for maximum subscriber utilization.

BRIEF SUMMARY OF THE INVENTION

An embodiment of the present invention provides a way for network operators to dynamically create and modify the business rules that govern how the access rights of a subscriber operate over the lifecycle of a session. At each transition in the rights of a subscriber within a particular session (e.g., acquisition of session rights, update of session rights, taking the session online, taking the session offline, and the expiration of the session), a flexible rule engine is used to allow the network operator to manage that transition in a manner that is responsive to the particular business conditions pertaining to that network operator.

In a preferred embodiment of the present invention, the flexible rule engine accepts rules that are expressed in the form of "if-condition-then-action-else-action." In this embodiment, conditions used as input to this logic include session information, subscriber information, and environmental information (e.g., time of day). Actions contemplated within this embodiment include allowance or denial of a session, modification of one or more attributes of the session, subscriber notification of the session rights, and promulgation of subscriber agreement terms into an active session.

Among other benefits, the invention allows network operators the flexibility to dynamically modify the rules that governs how session rights are granted to their network. This reduces cost, shortens time to market and allows new services to be deployed quickly.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The present invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
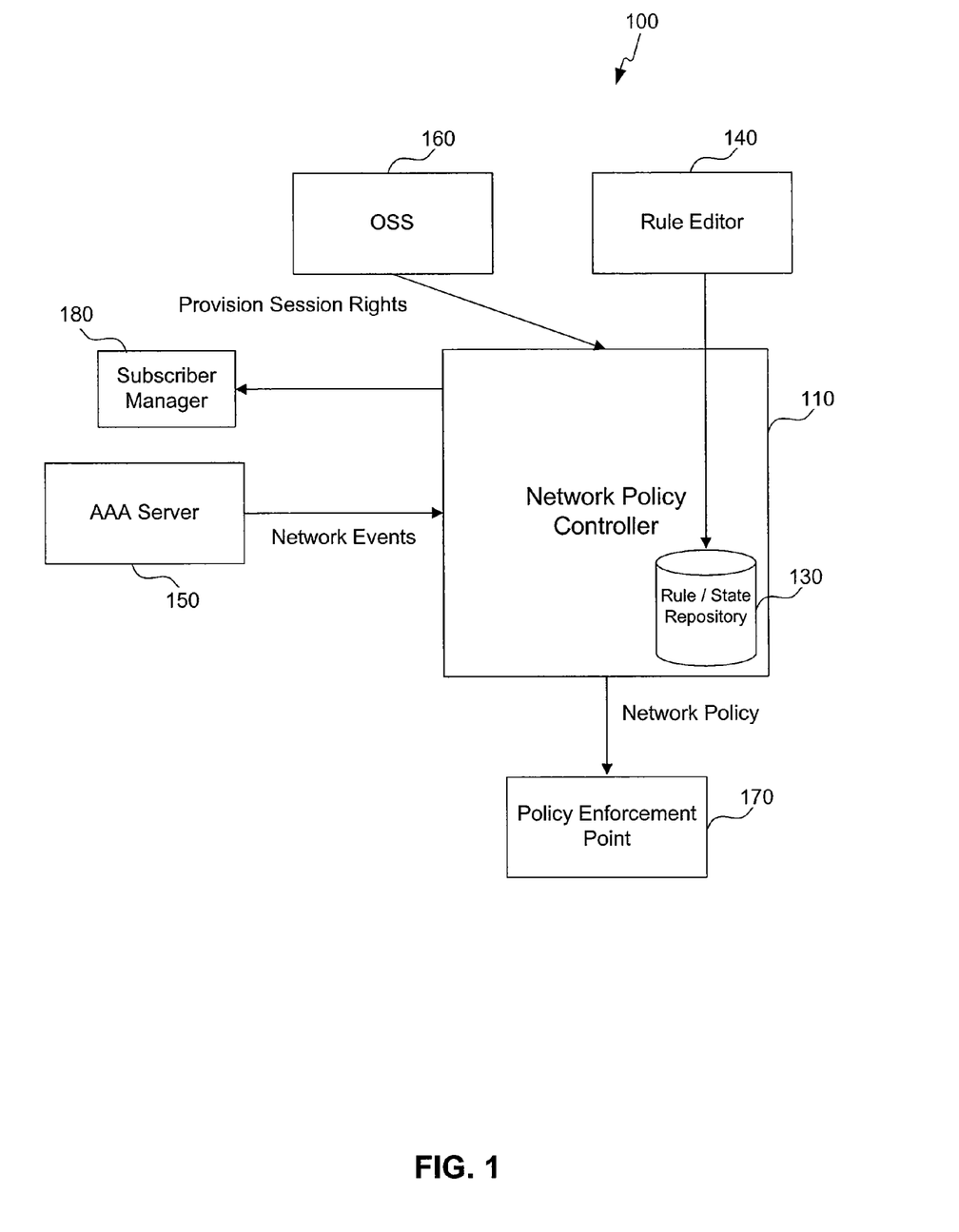
FIG. 1 provides a diagram showing a high level architecture of a system allowing a network operator to use flexible rules for subscriber access, according to an embodiment of the current invention.

FIG. 1 provides a diagram of a session rights management system 100, according to an embodiment of the current invention. The session rights management system 100 provides a means by which network operators may create and modify the business rules that govern the operation of the rights of a subscriber session throughout its lifecycle. Within the session rights management system 100 is a network policy controller 110 that controls access by a subscriber to a communications network via a policy enforcement point 170. The network policy controller 110 maintains subscriber state information and evaluates the flexible rules such that the current network policy can be delivered to the policy enforcement point 170 in real time. Coupled to the network policy controller 110 are the Authentication, Authorization, Accounting (AAA) server 150, the Operations Support System (OSS) 160, the policy enforcement point 170, and the subscriber manager 180. The policy enforcement point 170 is the network element that performs the policy enforcement functionality in the data layer of the network. As such, it controls access to the particular communications resource that the subscriber wishes to use during a particular session. In a communication network, that policy enforcement point 170 can be one of many types of device, including but not limited to: PDSN (packet data serving node) or HA (home agent) for CDMA networks, deep packet inspector for multiple network types, GGSN (gateway GPRS support node) for GSM-based networks, ASN (access service network) gateway or HA (home agent) for WiMax networks, BRAS (broadband remote access server) or router for DSL networks, and CMTS (cable modem termination system) for cable networks. The AAA server 150 notifies the network policy controller 110 of various network events, such as the start of a subscriber session, the in-progress status of a subscriber session, and the completion of a subscriber session. Accordingly, the AAA server 150 provides three functionalities, namely it authenticates each subscriber (via a username and password, for example), it determines whether the requested network element is authorized by the network provider for that subscriber, and it maintains an accounting of the network element utilization by each subscriber. The OSS 160 provides session rights information to the network policy controller 110. The subscriber manager 180 provides subscriber information that can be used in the evaluation of the flexible rules.

Embedded within the network policy controller 110 is the rule repository and state repository 130, to which the rule editor 140 is connected. In other embodiments the rule repository and state repository 130 may be located external to the network policy controller 110. The rule editor 140 provides the network operator with the ability to compose, edit and delete one or more rules in real time. A wide variety of user interfaces are contemplated for the rule editor 140, including off-line, text based, audio based, and graphical user interfaces.

Figure 2:
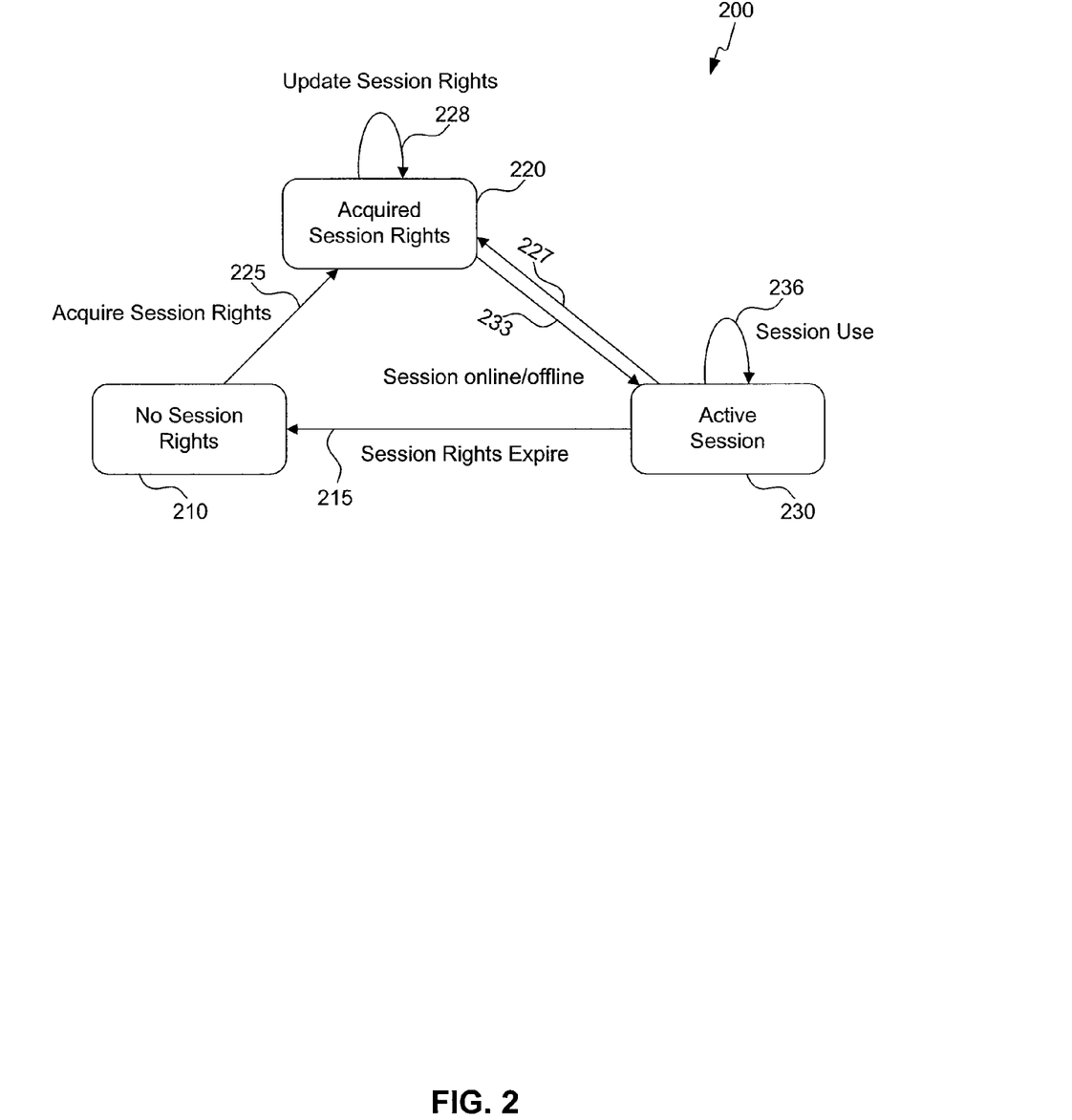
FIG. 2 provides a sample state diagram of access by a subscriber to a communications network.

During a typical subscriber session, a subscriber moves through various states. FIG. 2 illustrates a typical state diagram (200) for a subscriber who accesses a communications network. As shown, there are three main states for such a subscriber. The first state is the "no session rights" (210) state, which applies to a subscriber who has not met the requirements for access to the particular communications network. Alternatively, a subscriber may be in this state when the subscriber's session rights have expired (215) under the agreement with the network operator.

The second state for a subscriber in a communication network is that of "having acquired session rights" (220). Such a state is applicable to a subscriber who has acquired (225) session rights, or represents the inactive state of a subscriber who has unused rights to the network, but who is not actively using the network at a particular instant in time (227). In this state (220), the session rights can be updated (228) by the subscribers (e.g., increase the available session time). In addition, the network operator may also seek to update the session rights of the subscriber, if desired.

The third state for a subscriber in a communications network is that of an "active session" (230). A subscriber attains this state by moving (233) to an online session within the communications network. While in an "active session" (230), the network operator continuously monitors (236) the usage by the subscriber. In accordance with the terms of the subscriber agreement, the subscriber is transitioned (215) to the "no session rights" 210 state when the subscriber has exceeded the quota or terms of the agreement. In this state, the subscriber may be directed to a portal (e.g., a Web page), whereby a subscriber may purchase further access rights to the communications network.

As shown in FIG. 1, a rules repository and a state repository 130 are embedded within the network policy controller 110, according to an embodiment of the current invention. The network policy controller 110 implements the business policy decisions concerning subscriber access to applications. These policy decisions are reduced to a set of one or more rules, each of which can be expressed in a standardized format. That standardized format captures the two elements of a rule, namely the union of a condition with an action. If the condition is satisfied, then one or more actions are taken. Use of such a standardized format ensures that a session management system has considerable flexibility in terms of the types of rules, and therefore the business policy decisions, that may be implemented in a communications network. For example, by using such a broad format, a network provider can provide a solution that manages bandwidth, access to network elements, and quality of service to subscribers on a per-subscriber, per-session basis.

Conditions provide a result based upon information from such sources as the communications network information, external information (e.g. time of day), and subscriber information. Subscriber information used can include subscriber profile information (static information such as the identity of the subscriber, service tier within the subscriber agreement, etc.), subscriber state information (dynamic information such as the device used by the subscriber, the date of requested access, the location of the subscriber), and subscriber historical information (e.g. usage information, preferences, etc.).

The following conditions reveal a typical list of such conditions that are envisaged within the scope of the present invention: parameters that are sent in with the session rights request, provisioned subscriber information (e.g. age, physical location), active subscriber session information if the subscriber is currently online (e.g. IP address, network location), and time of day, day of the week, or the date.

Actions are the events undertaken by the session management system. In this context, actions involve one or more of the transitions of the type shown in the state diagram in FIG. 2. For example, should a subscriber have unused time, the session management system would take the action of allowing the subscriber to go "online". Similarly, should a subscriber exceed the terms of the subscriber agreement, the session management system would take the action of terminating the session.

The following actions reveal a typical list of such actions that are envisaged within the scope of the present invention: allow or deny the state transition, modify the attributes of the state transition, notify the subscriber of the state transition (e.g. via email, SMS, etc.), push the policy into the network to affect the subscriber's network access (e.g. terminate their session at the access gateway, redirect their HTTP traffic to a well-known location at the access gateway).

In a further embodiment of the present invention, a method and an apparatus are proposed that enable the communications network provider to dynamically create, modify, or delete one or more rules. In FIG. 1, a rule editor 140 is provided that can compose, edit, and delete one or more rules in real time. Such a method and apparatus enable the provider to implement business policy decisions as market conditions warrant, and thus substantially improve the time to market of new capabilities of the session management system. Therefore, by permitting the rules to be dynamically configurable, a real-time network policy controller 110 is available to the network provider. Accordingly, a communications network provider can optimize individual subscriber access and overall utilization of network elements on a real-time basis, as business conditions warrant.

Whether rules are implemented such that real-time adjustments can be made by the network provider (e.g. using a rule editor 140) or the rules require revisions by the session rights system supplier, in both cases, a variety of syntaxes can fulfill the standardized format used for a rule. In a further embodiment of the current invention, the following rule syntax is described:

---
If condition then
    Action(s)
Else
    Action(s)
---

As might be expected, the scope of the "condition" in this syntax can be expanded beyond a single condition into a more complex condition through the use of Boolean operators including, but not limited to, "and", "not", "nor", "xor", "nand", and "or". In a still further embodiment of the current invention, the scope of conditions covers an arbitrary number of such levels, as shown in the example below (wherein the braces { } indicate one or more repetitions of the enclosed terms):

---
If condition {(and|or) condition} then
    Action(s)
Else
    Action(s)
---

Similarly, in another embodiment of the current invention, the above rule syntax can be nested to include multiple if-then-else rules as is shown below.

---
If condition {(and|or) condition} then
    Action(s)
Else If condition {(and|or) condition} then
    Action(s)
Else
    Action(s)
---

In a simplified version of the above syntax, the if-then rule is also within the scope of the current invention, as shown below. This is equivalent to permitting a nullity as a valid action.

---
If condition {(and|or) condition} then
    Action(s)
---

A sample rule governing updating session rights is shown below, wherein a nullity is the action in the else branch of the "if" statement:

---
If
    (Update Session Right Attribute Notification Enabled equals to true and (Update Session Right Attribute Notification Threshold less than 60)
    )
Then
    Set Attribute Notification Threshold On Response Session Right to 60
Else
---

Figure 3:
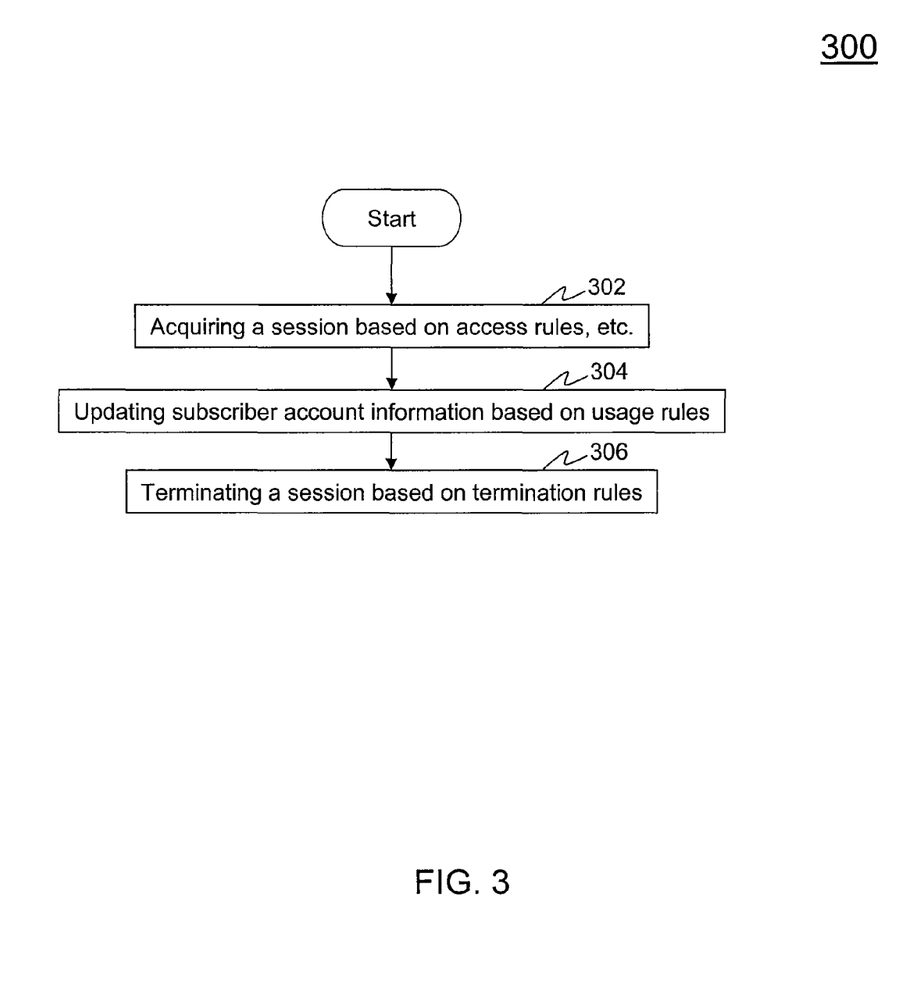
FIG. 3 provides an exemplary method for flexible management of subscriber session rights in a communications network.

FIG. 3 provides an exemplary method 300 for a flexible management of subscriber session rights in a communications network. Method 300 begins at step 302.

At step 302, the method provides for acquiring a session based on access rules, subscriber request, subscriber account information, network status information, time of day, day of week, and date, wherein said access rules are dynamically adaptable.

At step 304, the method provides for updating subscriber account information based on usage rules, subscriber account information, network status information, session duration, time of day, day of week, and date, wherein said usage rules are dynamically adaptable.

At step 306, the method provides for terminating a session based on termination rules, subscriber request, subscriber account information, network event information, time of day, day of week, and date, wherein said termination rules are dynamically adaptable.

By adopting the rule syntax described above, a comprehensive implementation of business policies is available, such that a network operator may readily adopt network management policies. The rules engine is comprehensive by virtue of the fact that most business rules (as they pertain to subscriber access to a communications network) can be re-cast as a sequence of logical rules using the above format. The rules engine is also flexible since by adopting this generalized syntax for the rules formulation, a rules engine may be developed with which to interpret these rules in a dynamic, and easily configurable manner.

Computer System Implementation

Figure 4:
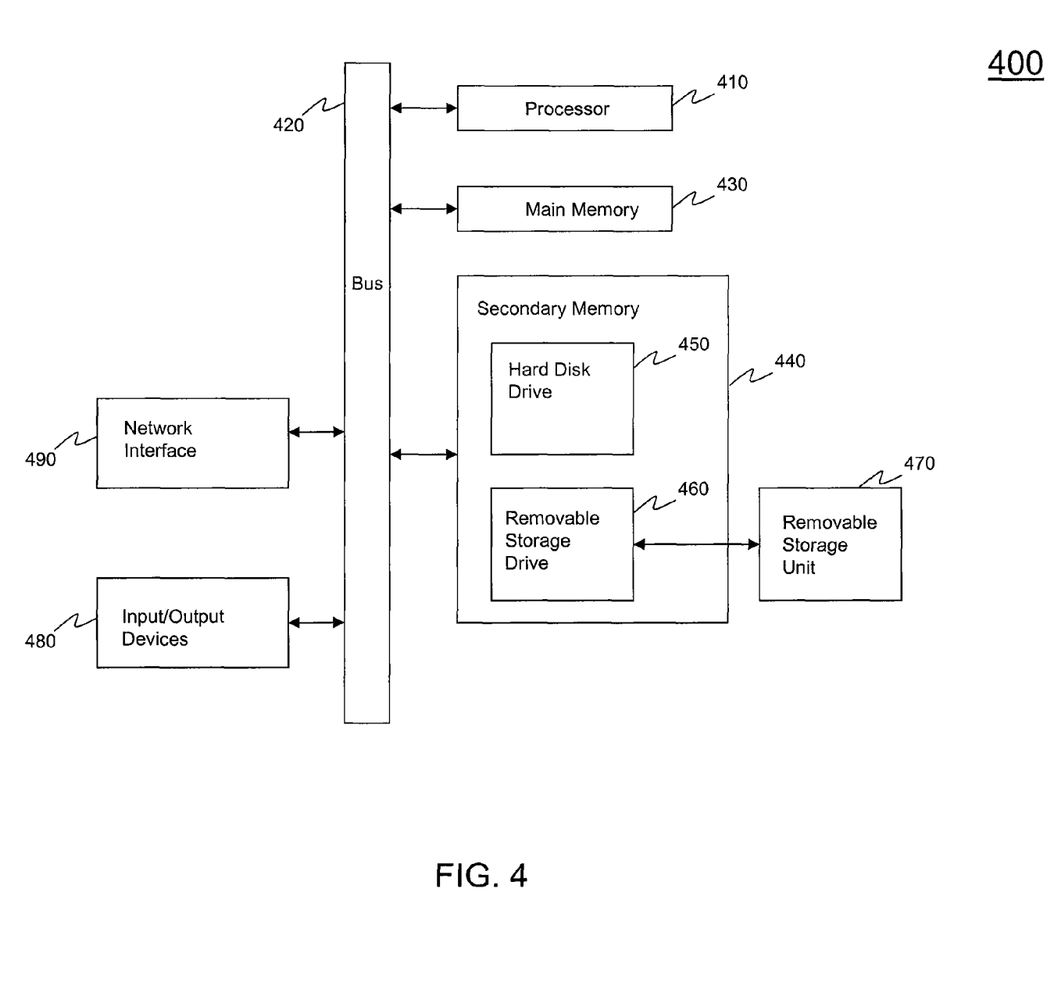
FIG. 4 is a diagram of a computer system on which the methods and systems herein described can be implemented, according to an embodiment of the invention.

In an embodiment of the present invention, the methods and systems of the present invention described herein are implemented using well known computers, such as a computer 400 shown in FIG. 4. The computer 400 can be any commercially available and well known computer capable of performing the functions described herein, such as computers available from International Business Machines, Apple, Sun, HP, Dell, Cray, etc.

Computer 400 includes one or more processors (also called central processing units, or CPUs), such as processor 410. Processor 410 is connected to communication bus 420. Computer 400 also includes a main or primary memory 430, preferably random access memory (RAM). Primary memory 430 has stored therein control logic (computer software), and data.

Computer 400 may also include one or more secondary storage devices 440. Secondary storage devices 440 include, for example, hard disk drive 450 and/or removable storage device or drive 460. Removable storage drive 460 represents a floppy disk drive, a magnetic tape drive, a compact disk drive, an optical storage device, tape backup, ZIP drive, JAZZ drive, etc.

Removable storage drive 460 interacts with removable storage unit 470. As will be appreciated, removable storage unit 460 includes a computer usable or readable storage medium having stored therein computer software (control logic) and/or data. Removable storage drive 460 reads from and/or writes to the removable storage unit 470 in a well known manner.

Removable storage unit 470, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 400, or multiple computer 400s to perform any combination of the functions described herein Computer programs (also called computer control logic) are stored in main memory 430 and/or the secondary storage devices 440. Such computer programs, when executed, direct computer 400 to perform the functions of the present invention as discussed herein. In particular, the computer programs, when executed, enable processor 410 to perform the functions of the present invention. Accordingly, such computer programs represent controllers of the computer 400.

Computer 400 also includes input/output/display devices 480, such as monitors, keyboards, pointing devices, etc.

Computer 400 further includes a communication or network interface 490. Network interface 490 enables computer 400 to communicate with remote devices. For example, network interface 490 allows computer 400 to communicate over communication networks, such as LANs, WANs, the Internet, etc. Network interface 490 may interface with remote sites or networks via wired or wireless connections. Computer 400 receives data and/or computer programs via network interface 490. The electrical/magnetic signals having contained therein data and/or computer programs received or transmitted by the computer 400 via interface 490 also represent computer program product(s).

The invention can work with software, hardware, and operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The breadth and scope of the present invention should not be limited by any of the above-described exemplary embodiments, but should be defined only in accordance with the following claims and their equivalents.

What is claimed is:

1. A session controller device for provisioning communications network access for a subscriber, comprising:
   a rules engine having an input port adapted to receive a plurality of session rules associated with a session of a subscriber, and to receive one or more of session information, subscriber account information, network status information and temporal information, and wherein said rules engine is configured to trigger a network provisioning action based on the one or more session rules and the one or more of session information, subscriber account information, network status information and temporal information;
   wherein the plurality of session rules include actions to be performed during each of a plurality of transitions in rights of the subscriber within the session, such that the one or more session rules include actions to be performed during an acquisition of session rights, an update of session rights, a taking of the session online, a taking of the session offline, and an expiration of the session;
   wherein the network provisioning action is a policy decision concerning access by a network element of the subscriber to a network application, and includes a denial of a state transition, a modification of attributes of the state transition, a notification to a subscriber of the state transition, a termination of the session at an access gateway, and a redirection of HTTP traffic to a location at an access gateway;

wherein the policy decision is sent to a policy enforcement point for controlling access by the subscriber to the network application in accordance with the policy decision.

2. The session controller device of claim 1, wherein the session rules include one or more access rules, usage rules, and termination rules.

3. The session controller device of claim 1, wherein the session information includes one or more of session duration, IP address, and network location.

4. The session controller device of claim 1, wherein the subscriber account information includes subscriber profile information, a subscriber identity, a subscriber age, a subscriber service tier, subscriber state information, a subscriber communications device, a date of requested access, a subscriber location, subscriber historical information, usage information, and subscriber preferences.

5. The session controller device of claim 1, wherein the temporal information includes one or more of time of day, day of week, and date.

6. The session controller device of claim 1, wherein the session rules comprise if-condition-then-action rules.

7. The session controller device of claim 1, wherein the session rules comprise if-condition-then-action-else-action rules.

8. The session controller device of claim 1, wherein the network provisioning action is real-time.

9. The session controller device of claim 1, further comprising: a rules editor adapted to receive an input via a user-interface and configured to adjust one or more of the plurality of session rules in response to the input.

10. The session controller device of claim 9, wherein the user-interface includes one or more of an off-line interface, a text-based interface, an audio-based interface, and a graphical user interface.

11. The session controller device of claim 9, wherein the adjustment of the one or more session rules is real-time.

12. The session controller device of claim 9, wherein configured to adjust the one or more session rules includes at least one of compose, edit, and delete one or more session rules.

13. A method of enforcing agreements governing subscriber access sessions on a communications network, comprising:
  acquiring a session based on access rules, and one or more of subscriber request, subscriber account information, network status information, time of day, day of week, and date, wherein said access rules are dynamically adaptable;
  updating subscriber account information based on usage rules, and one or more of subscriber account information, network status information, session duration, time of day, day of week, and date, wherein said usage rules are dynamically adaptable; and
  terminating a session, using a processor, based on termination rules, and one or more of subscriber request, subscriber account information, network event information, time of day, day of week, and date, wherein said termination rules are dynamically adaptable;
  wherein the acquiring, updating, and terminating are policy decisions associated with a session of a network element of a subscriber that are determined by a rules engine, and include a denial of a state transition, a modification of attributes of the state transition, a notification to a subscriber of the state transition, a termination of the session at an access gateway, and a redirection of HTTP traffic to a location at an access gateway, and wherein the policy decisions are sent to a policy enforcement point for controlling the session in accordance with the policy decisions;
  wherein the access rules, usage rules, and termination rules include actions to be performed during each of a plurality of transitions in rights of the subscriber within the session, such that the actions are performed during an acquisition of session rights, an update of session rights, a taking of the session online, a taking of the session offline, and an expiration of the session.

14. The method of claim 13, wherein at least one of the access rules comprises an if-condition-then-action-else-action rule.

15. The method of claim 13, wherein at least one of the usage rules comprises an if-condition-then-action-else-action rule.

16. The method of claim 13, wherein at least one of the termination rules comprises an if-condition-then-action-else-action rule.

17. The method of claim 13, wherein at least one of the access rules comprises an if-condition-then-action rule.

18. The method of claim 13, wherein at least one of the usage rules comprises an if-condition-then-action rule.

19. The method of claim 13, wherein at least one of the termination rules comprises an if-condition-then-action rule.

20. A non-transitory computer-readable medium containing instructions for controlling at least one processor by a method, comprising:
  acquiring a session based on access rules, subscriber request, subscriber account information, network status information, time of day, day of week, and date, wherein said access rules are dynamically adaptable;
  updating subscriber account information based on usage rules, subscriber account information, network status information, session duration, time of day, day of week, and date, wherein said usage rules are dynamically adaptable; and
  terminating a session based on termination rules, subscriber request, subscriber account information, network event information, time of day, day of week, and date, wherein said termination rules are dynamically adaptable;
  wherein the acquiring, updating, and terminating are policy decisions associated with a session of a network element of a subscriber that are determined by a rules engine, and include a denial of a state transition, a modification of attributes of the state transition, a notification to a subscriber of the state transition, a termination of the session at an access gateway, and a redirection of HTTP traffic to a location at an access gateway, and wherein the policy decisions are sent to a policy enforcement point for controlling the session in accordance with the policy decisions;
  wherein the access rules, usage rules, and termination rules include actions to be performed during each of a plurality of transitions in rights of the subscriber within the session, such that the actions are performed during an acquisition of session rights, an update of session rights, a taking of the session online, a taking of the session offline, and an expiration of the session.

21. The session controller device of claim 1, wherein the rules engine is further operable to receive notification from a server of an occurrence of an event that is associated with the subscriber and that is of one of a plurality of predetermined types, and in response to the receipt of the notification the rules engine triggers the network provisioning action.

22. The session controller device of claim 21, wherein the predetermined types of events for which the rule engine receives the notification include a start of the session of the subscriber, an in-progress status of the session of the subscriber, and a completion of the session of the subscriber.

23. The session controller device of claim 1, wherein the plurality of session rules are used by a network operator to manage the transitions in the rights of the subscriber in a manner that is responsive to one or more business conditions associated with the network operator.

24. The session controller device of claim 1, wherein the network operator utilizes the rules engine to manage bandwidth, access to network elements, and quality of service on a per-subscriber, per-session basis.

25. The session controller device of claim 1, wherein the plurality of session rules are dynamically configurable, such that each of the plurality of session rules are capable of being edited or deleted in real time by a provider utilizing a rule editor.

* * * * *